United States Patent [19]

Ungar et al.

[11] Patent Number: 4,713,138

[45] Date of Patent: Dec. 15, 1987

[54] METHOD OF PRODUCING ABRASION-RESISTANT DECORATIVE LAMINATE

[75] Inventors: Israel S. Ungar, Randallstown; Nelson L. O'Neill, Crofton; Herbert I. Scher, Randallstown; Robin D. O'Dell, Pasadena, all of Md.

[73] Assignee: Nevamar Corporation, Odenton, Md.

[21] Appl. No.: 686,350

[22] Filed: Dec. 26, 1984

[51] Int. Cl.⁴ ............................................ C09J 5/02
[52] U.S. Cl. ................................. 156/307.4; 156/83; 427/391; 428/326; 428/328; 428/530; 524/35
[58] Field of Search .............. 156/83, 307.4; 427/391; 428/326, 530, 328; 524/35

[56] References Cited

U.S. PATENT DOCUMENTS

| | | |
|---|---|---|
| 2,366,564 | 1/1945 | Shaw . |
| 2,732,325 | 1/1956 | Linderfelser et al. . |
| 2,739,081 | 3/1956 | Wohnsiedler et al. . |
| 3,287,207 | 11/1966 | Treat . |
| 3,346,443 | 10/1967 | Elmer . |
| 3,351,507 | 11/1967 | Schafer . |
| 3,373,070 | 3/1968 | Fuerst ................................ 428/530 |
| 3,373,071 | 3/1968 | Fuerst ................................ 428/530 |
| 3,396,067 | 8/1968 | Schafer . |
| 3,403,071 | 9/1968 | Perry et al. . |
| 3,451,837 | 6/1969 | Mork . |
| 3,475,240 | 10/1969 | Manaka et al. . |
| 3,509,019 | 4/1970 | Beacham . |
| 3,525,664 | 8/1970 | Hale et al. . |
| 3,540,978 | 11/1970 | Ames . |
| 3,556,915 | 1/1971 | Stanley et al. . |
| 3,669,727 | 6/1972 | Raymond . |
| 3,706,511 | 12/1972 | Abbott . |
| 3,736,220 | 5/1973 | Shah . |
| 3,756,901 | 9/1973 | Veneziale, Jr. . |
| 3,802,955 | 4/1974 | Powanda et al. . |
| 3,834,964 | 9/1974 | Blasing . |
| 3,891,788 | 6/1975 | Karszes . |
| 3,914,523 | 10/1975 | Schnee et al. . |
| 3,928,706 | 12/1975 | Gibbons ................................ 428/328 |
| 3,930,070 | 12/1975 | Cronenberger et al. . |
| 3,940,538 | 2/1976 | Palazzolo et al. . |
| 3,949,133 | 4/1976 | Santurri et al. . |
| 3,968,291 | 2/1976 | Chevallier ............................ 428/530 |
| 3,975,572 | 8/1976 | Power . |
| 4,012,561 | 3/1977 | Doughty et al. . |
| 4,017,658 | 4/1977 | Bomboire . |
| 4,044,185 | 8/1977 | McCaskey, Jr. et al. . |
| 4,046,952 | 9/1977 | Shoemaker et al. . |
| 4,060,711 | 11/1977 | Buros . |
| 4,061,823 | 12/1977 | McCaskey, Jr. et al. . |
| 4,123,579 | 10/1978 | McCaskey, Jr. . |
| 4,322,468 | 3/1982 | Raghava .............................. 428/530 |
| 4,473,613 | 9/1984 | Jaisle et al. ......................... 428/530 |

FOREIGN PATENT DOCUMENTS

| | | |
|---|---|---|
| 600787 | 6/1960 | Canada ............................ 156/307.4 |
| 50-78670 | 6/1975 | Japan . |
| 857491 | 12/1960 | United Kingdom . |
| 986721 | 3/1965 | United Kingdom . |
| 1013662 | 12/1965 | United Kingdom . |
| 1221976 | 2/1971 | United Kingdom . |

*Primary Examiner*—John J. Gallagher
*Attorney, Agent, or Firm*—Browdy and Neimark

[57] ABSTRACT

An improved process of making abrasion-resistant decorative laminate without overlay comprises simultaneously impregnating and coating a laminate decor sheet with a mixture of the liquid impregnating resin and an abrasion-resistant composition of microcrystalline cellulose and abrasion-resistant mineral particles such as alumina. The microcrystalline cellulose functions not only as a binder material in the product, but also serves to maintain the mineral particles in suspension in the liquid resin. The mixture is deposited onto the top surface of the decor sheet which absorbs the liquid resin leaving on the upper surface thereof an ultra-thin layer of the abrasion-resistant composition plus a small amount of resin. After drying, the decor sheet is ready for use in the manufacture of high and low pressure decorative laminates.

19 Claims, No Drawings

METHOD OF PRODUCING ABRASION-RESISTANT DECORATIVE LAMINATE

FIELD OF INVENTION

The present invention relates to laminates and, more particularly, an improved method of making high abrasion-resistant decorative laminates.

BACKGROUND

Decorative laminates have been conventionally made by stacking and curing under heat and pressure a plurality of layers of paper impregnated with synthetic thermosetting resins. Normally, the assembly, from the bottom up, consists of a plurality, e.g. three to eight, core sheets made from phenolic resin impregnated kraft paper, above which lies a decor sheet impregnated with melamine resin, over which is provided an overlay sheet which, in the laminate, is almost transparent and provides protection for the decor sheet.

Recently, a revolutionary improvement has been developed which forms the subject matter of Scher et al U.S. Pat. Nos. 4,255,480; 4,263, 081; 4,305,987; 4,327,141; 4,395,452 and 4,400,423 These disclosures are incorporated by reference, and hereinafter reference will be made to Scher et al U.S. Pat. No. 4,255,480. This patent discloses the manufacture of decorative laminates having an ultra-thin protective coating deposited as the uppermost layer of the decor sheet, and which has enhanced abrasion-resistant properties compared with the typical laminate as described above.

According to the process of Scher et al U.S. Pat. No. 4,255,480, the decor sheet is coated with an ultra-thin wet layer of a mixture of an abrasion-resistant hard mineral of particle size exit 20–50 microns, e.g. alumina, in quantities sufficient to provide an abrasion-resistant layer without interfering with visibility, and a binder material for the mineral which binder material, preferably microcrystalline cellulose together with carboxy methyl cellulose, has the properties of withstanding the subsequent laminating condition and which is compatible with the thermosetting resin and which binder material is present in an amount sufficient to bind the abrasion-resistant mineral to the surface of the decor sheet. The coating is then dried at a temperature sufficiently high, at least 140° F. and preferably 180° F., to enhance the bonding of the abrasion-resistant material by the binder material to the face of the decor sheet. Next the coated decor sheet is impregnated with the thermosetting resin. The resultant decor sheet is then used in place of conventional decor sheet in making high and low pressure decorative laminates, without the necessity of using an overlay sheet.

The process of Scher et al U.S. Pat. No. 4,255,480 provides a number of important procedural advantages, besides producing a much better product, and these advantages are outlined in such patent. However, in spite of the considerable product and process improvements which are achieved, the process of U.S. Pat. No. 4,255,480 still requires a double handling of the decor sheet, i.e. it must first be coated and dried, and then impregnated or saturated with the resin, and this results in double losses in the sense that any single handling operation causes inevitable losses, and double handling causes increased losses. In addition, if the ultra-thin abrasion-resistant coating is heavy or the paper particularly dense, as is sometimes the case with certain decor sheets in which a design is printed on highly calendered paper. saturation may be poor which results in poor surface durability, mottling or other defects.

Both the problems with losses and saturating could be solved by a coating method which saturates and coats simultaneously, and therefore such a method would be procedurally desirable.

Of interest as background patents are the early patents to Fuerst U.S. Pat. Nos. 3,373,070 and 3,373,071. The technique of Fuerst is to impregnate the decor sheet first with plain melamine resin, and then apply a thick coating to the surface of the impregnated sheet using a relatively viscous mixture of 2,000–60,000 centipoise. Because the decor paper is already saturated at the time the viscous mixture is applied, it will not be absorbed by the decor sheet, and the viscous coating is dried on the surface. Indeed, Fuerst specifies slow drying which also tends to maintain the surface coating distinct from the decor sheet. The resultant dried surface coating is in essence a formed in situ overlay sheet having a thickness of 2–3 mils and double handling is required.

Two patents of more recent vintage than the Fuerst patents are those of Power U.S. Pat. No. 3,975,572 and Raghava U.S. Pat. No. 4,322,468. While the Power patent is based primarily on the concept of the use of a special acrylic resin-melamine/formaldehyde resin composition which, like the coating of the Fuerst patents, is applied over the already impregnated decor sheet (and indeed after the saturated decor sheet has been dried; see col. 8, lines 47–51), the patentee does mention in passing that "it may be useful to first coat the decorative sheet, dry it and then impregnate with the impregnating composition in some instances" (col. 8, lines 51–55).

Raghava U.S. Pat. No. 4,322,468 relies on a special coating composition of a fully hydrolyzed polyvinyl alcohol modified melamine-formaldehyde resin. The patentee indicates that "the print sheet is first impregnated with a melamine-formaldehyde resin and subsequently dried before the coating operation is commenced" (col. 6, lines 14–17). Abrasive material may be included in the impregnating thermosetting resin, in which case a thin layer of abrasive particles is said to be deposited on the surface of the decor sheet (col 4, lines 25–29).

Besides requiring the utilization of special types of overcoating resins and inability to make the product of Scher et al U.S. Pat. No. 4,255,480, the Power and Raghava methods have three undesirable characteristics. First, double handling is required in most or all instances and two resin systems are required. Second, after impregnation, the core sheet is at least partially dried which has the tendency of creating an entity which, although ultimately united to the special resin later overcoated, retains its distinctiveness as a separate layer. Third, although the abrasive particles can be maintained in suspension in the impregnating resin when using laboratory equipment, and this only by considerable agitation, the problem of the grit settling becomes almost impossible to solve in commercial production equipment.

SUMMARY

It is, accordingly, an object of the present invention to overcome the deficiencies of the prior art, such as indicated above.

It is another object of the present invention to provide for the manufacture of decorative laminate in a less expensive manner.

Another object of the invention is to provide an improved process for the manufacture of abrasion-resistant decorative laminates of the type disclosed in Scher et al U.S. Pat. No. 4,255,480.

These and other objects of the invention are attained by carrying out simultaneous saturation and coating of the laminate facing sheet, e.g. the decor sheet, in such a way that the facing sheet, i.e. the uppermost sheet of the laminate becomes coated with the ultra-thin abrasion-resistant deposit of the type disclosed in Scher et al U.S. Pat. No. 4,225,480 and at the same time becomes completely saturated with the thermosettable impregnating resin, e.g. melamine/formaldehyde resin or polyester resin. After drying at an elevated temperature of at least 140° F., the resultant facing paper is then used to produce high or low pressure decorative laminates having enhanced abrasion-resistance, as disclosed in U.S. Pat. No. 4,255,480, the resultant laminates providing a product which is virtually indistinguishable form the products of U.S. Pat. No. 4,255,480.

DETAILED DESCRIPTION OF EMBODIMENTS

The process of the present invention involves depositing on the surface of a decor sheet an ultra-thin layer of abrasion-resistant material, which material is substantially as disclosed in U.S. Pat. No. 4,255,480, simultaneously with the complete resin saturation of the decor sheet in a single step operation, in which the resin is a carrier for the abrasion-resistant material. A mixture of the thermosettable impregnating resin and the components of the ultra-thin abrasion-resistant layer is coated on the surface of the decor paper in such a manner as to allow the resin to penetrate into the decor paper. This leaves an ultra-thin layer of the abrasion-resistant composition on the surface which yields all of the abrasion-resistant properties provided in the two-step coating treatment technique of U.S. Pat. No. 4,255,480. As an optional, non-preferred step which sometimes may be useful, e.g. when the decor sheet is calendered and has a print design on its surface, additional thermosettable resin may be applied to the bottom of the decor sheet at the same time the mixture is applied to the upper surface, or more suitably immediately downstream therefrom.

By the use of the term "abrasion-resistant composition", what is meant is the composition which is applied as an ultra-thin layer in U.S. Pat. No. 4,255,480 and modifications thereof, such as disclosed in the O'Dell et al application Ser. No. 508,629, filed June 28, 1983. Such an "abrasion-resistant composition" consists essentially of an abrasion-resistant hard mineral of fine particle size, preferably about 20–50 microns, in quantities sufficient to provide an abrasion-resistant layer without interfering with visibility, preferably alumina, silica or a mixture thereof; and binder material for such mineral which binder material has the properties of withstanding the subsequent laminating conditions and which binder material is compatible with the thermosetting resin, such binder material being present in an amount sufficient to bind the abrasion-resistant mineral to the surface of the decor sheet. Such binder material is preferably a mixture of microcrystalline cellulose with a minor amount of carboxy methyl cellulose; "AVICEL" is sold as a mixture of approximately 89% microcrystalline cellulose and 11% carboxy methyl cellulose. The composition suitably contains 1–8 parts by weight of "AVICEL" to 4–32 parts by weight of mineral particles preferably at a ratio of mineral particles to binder material of 4:1 to 1:2, and a quantity of 1 part of "AVICEL" per 2 parts of mineral particles has been found to be particularly suitable.

While the composition may also contain a small additional quantity of carboxy methyl cellulose (or none whatsoever) and a small quantity of silane, these options are not preferred. On the other hand, it is preferred to include a small quantity of surfactant as disclosed in U.S. Pat. No. 4,255,480, and a small quantity of solid lubricant to provide scuff resistance as disclosed in copending application Ser. No. 508,629.

An important aspect of the invention is the provision of a proper ratio between the thermosettable saturating resin and the abrasion-resistant composition. According to the invention, the ratio of the abrasion-resistant composition to resin is selected to provide about 2 to about 10 pounds per ream (a "ream" in the present field is 3,000 ft$^2$) of abrasion-resistant composition to the decor surface, at the appropriate resin content for the particular type of decor paper. Thus, for printed decor paper requiring about 40–50% resin content to make a good laminate, and 5–10 pounds per ream of abrasion-resistant composition, the concentration of abrasion-resistant powder in the liquid resin should be, for best results, from about 43% to about 20% by weight, based on resin solids. For unprinted solid colored decor paper, where the paper is typically considerably less dense, requiring about 45–60% resin content, and about 2–4 pounds per ream of abrasion-resistant composition, the concentration of abrasion-resistant powder added to the resin should be from about 2% to about 4% for best results.

A major problem to overcome in the application of the coating is the resistance to penetration of the paper due to high viscosity of the abrasion-resistant composition/resin mixture. In this regard it should be understood that when the binder material comprises microcrystalline cellulose as is preferred, some small degree of expansion or swelling (disaggregation) of the microcrystalline cellulose is required for the process to work, and this expansion causes a slight increase in the viscosity of the resin/abrasion-resistant composition mixture, it being understood that the swelling or expansion of the microcrystalline cellulose serves to retain the mineral particles in suspension within the liquid thermosettable resin.

An important discovery leading to the present invention was that microcrystalline cellulose can be disaggregated in the water fraction of the resin and still provide the binding effect between the abrasion-resistant particles and the cellulose fibers of the decor paper. While Scher et al U.S. Pat. No. 4,255,480 teaches the use of microcrystalline cellulose binder which required controlled disaggregation in water, there was no understanding at the time of such patent, and indeed the teachings of such patent appear to be counter thereto, that the microcrystalline cellulose could be disaggregated in the water fraction of the resin.

Returning to the problem of control of viscosity in the present invention, if the viscosity is permitted to increase too much, there is incomplete absorption of the saturating resin into the decor paper, and this results in either reduced product quality or it requires the optional step of applying additional saturating resin from the bottom of the decor paper. It has been discovered experimentally that good penetration from the top will result only if viscosities are no more than about 200 centipoise (Brookfield at 12 rpm No. 3 spindle) and preferably less than 100 centipoise. More porous paper (such as solid color decor sheet) will tolerate higher viscosity during impregnation, compared with dense highly calendered print sheet.

The requirement of good saturation identifies a major operating parameter. The final mixture viscosity should be low enough so that almost immediate saturation of the thermosettable resin occurs after coating of the decor paper. The viscosity of the abrasion-resistant composition/resin mixture when applied to solid colored decor paper is a direct result of the ratio of binder material, e.g. "AVICEL", to total liquid. To better explain the restrictions in formulation, the following table is provided which compares the compositions for application respectively to 65 pound solid colored decor Paper, 85 pound solid colored decor paper, and 50 pound printed woodgrain decor paper. The weights expressed in Table 1 below are set forth in terms of requirements per ream (3,000 sq. ft.).

TABLE 1

|  | 65# Solid | 80# Solid | 50# Woodgrain |
|---|---|---|---|
| Resin Content | 54% | 54% | 45% |
| Dry Resin Weight | 72.8# | 88.7# | 41.6# |
| Abrasion-resistant Comp. | 3.3# | 3.3# | 7.3# |
| Uncut Resin Weight (1.2 density) | 117.4# | 143.1# | 67.1# |
| Approx. Viscosity Uncut | ≈400 cps | ≈300 cps | ≈5000 cps |
| Viscosity required for saturation | 100 cps | 100 cps | 100 cps |
| Additional water required for 100 cps | 75.4# | 91.9# | 44.1# |
| Water to Resin Ratio | 0.64:1 | 0.64:1 | 0.65:1 |
| Total Liquid Weight | 196.1# | 238.3# | 118.5# |
| Wet Film Thickness | 0.011" | 0.013" | 0.007" |
| Final Viscosity | 80 cps | 65 cps | 100 cps |

With regard to the wet film thickness given in Table 1 above, it will be understood that this is the thickness applied by the coating device. As the resin is quickly absorbed by the decor paper, the resultant wet thickness after such absorption is similar to that described by separately providing the ultra-thin layer in accordance with U.S. Pat. No. 4,255,480 and, after conventional oven drying (at a temperature of 200°-350° F. to "B" stage the melamine resin, or at least 140° F. and preferably at least 180° F. for polyester resin), the dry coating has an even lesser thickness.

The data presented above in Table 1 helps define the parameters of the present method. There are six important variables in the formulation, three of which are independent and three of which are dependent. Decor paper weight, resin content and weight of abrasion-resistant composition are all independent of the formulation. The requirements for these variables are set by outside factors such as color, degree of final saturation, and abrasion resistance. Resin weight (dry) per ream is dependent on a combination of paper basis weight and resin content. Viscosity is dependent on the total volume of liquid versus the content of abrasion-resistant composition. For complete saturation of the decor paper at the coater, the mixture viscosity should be less than 200 centipoise for porous paper, preferably in the range of 50-100 centipoise depending on paper porosity. Therefore, the amount of water added to the resin is dependent on the viscosity achieved by mixing the abrasion-resistant composition and uncut resin, and the additional volume required to reduce the viscosity to the desired level of about 100 centipoise: or other means must be provided for viscosity reduction.

From Table 1 above, it will be noted that the heavier the basis weight of decor paper, the greater is the volume of liquid resin required. This yields a corresponding lower final viscosity on the 80 pound paper coating as compared to the 65 pound paper coating. On printed (calendered) decor paper, i.e. at 50 pounds per ream, using more than twice as much abrasion-resistant composition as the solid colored decor paper, final viscosities are higher due to the high abrasion-resistant composition to volume ratio.

Suitable formulations for each of the three types of decor paper set forth above in Table 1, are given below in Table 2, exclusive of the added amount of water necessary to bring the viscosity to the desired level. The thermosettable saturating resin is melamine-formaldehyde resin.

TABLE 2

|  | 65# Solids | 80# Solids | 50# Woodgrains |
|---|---|---|---|
| 1.150 density resin at 37.7% solids | 192.8# | 235.0# | 111.2# |
| TRITON CF21 Surfactant | 0.001 | 0.001 | 0.001 |
| SHAMROCK 394 Polyethylene | 0.25 | 0.25 | 0.30 |
| CMC 7L2 | — | — | 0.35 |
| AVICEL (~11% CMC; 89% microcrystalline cellulose) | 1.0 | 1.0 | 2.33 |
| Alumina | 2.0 | 2.0 | 4.66 |
| H₂O | — | — | — |
| lbs. total coating/ream | 196.051 | 238.25 | 142.841 |

Because of the large number of variables and the difficulty in obtaining the best results unless such variables are suitably selected in relation to one another, Table 3 below is provided to give guidance to those desiring to practice the present invention using the specified decor papers. Variations for other basis weight decor papers can be easily determined by routine testing, or by calculation using the simplified calculations provided below:

Assume for a simple example that the following variables are selected:

| Paper weight = | 50 lbs./ream |
|---|---|
| Desired coat weight for binder material/mineral particles | 3.0 lbs./ream |
| Desired resin content = | 50% |

Since the paper+binder material=53 lbs , then exactly 53 lbs. of resin would provide 50% resin content.

If one maintains the above binder/mineral weight and resin content, but coats 80 lbs./ream paper:
Paper+binder/mineral=83 lbs. and one would need 83 lbs. of resin to provide 50% resin content.
If in the above example, one wants 55% resin content, (45% non-resin solids), then $$\frac{83}{.45} = 184.4 \text{ lbs. total weight}$$
$$-83.0 \text{ lbs. paper + binder/mineral}$$

-continued

Resin solids required = 101.4 lbs.

Please note that the above calculation method does not take into account the effect of volatile content and oven yield loss of resin (due to a small amount of resin condensation). Therefore, the formulations given in Table 3 below are slightly different than would be obtained from the above simplified method.

TABLE 3

I. FORMULATION MODIFICATION OF COATING COMPOSITION TO ADJUST FOR VARIOUS BASIS WT. PAPERS (SOLID COLORS).

(a) Selections:

| | | | |
|---|---|---|---|
| Paper Basis Wt. | 65# | 80# | 105# |
| Binder Material/Mineral Particle Coat Weight | 3.3# | 3.3# | 3.3# |
| Preferred Resin Content | 52% | 52% | 52% |
| Preferred Resin Solids | 74# | 90# | 117# |

(b) Formulations:

| | | | |
|---|---|---|---|
| Binder Material/Mineral Particle Components | 3.3# | 3.3# | 3.3# |
| Resin @ 64% Solids 1.26 Sg. | 115# | 140# | 182# |
| Additional Water | 32# | 39# | 52# |
| Total Liquid Coating per 3000 sq. ft. | 150.3# | 182.3# | 237.3# |

1. Binder material/mineral particle component weight per ream stays constant for the various solid color basis weight papers. The resin volume changes according to basis weight of the paper.
2. All weights reflect pounds (#) per 3000 sq. ft. ream
3. Binder material/mineral particle components consist of the following (expressed in pounds per ream):

| | |
|---|---|
| Avicel | 1# |
| Microgrit | 2# |
| Micronized Polyethylene | 0.3# |
| | 3.3# |

II. COMPARISON OF PRINTED PATTERN PREFERENCES TO SOLID COLOR PATTERN PREFERENCES.

| | PRINTED | SOLID COLOR |
|---|---|---|
| Paper Weight per 3000 Sq. ft. | 50# | 65# |
| Binder Material/Mineral Particle Coat Weight Range | 6#-8# | 2.8#-4.5# |
| Resin Content Range % | 44%-52% | 44.3-55.4% |
| Binder Material/Mineral Particle Solids % of Dry Coating | 14.67% | 5.2% |
| Resin Solids % of Dry Coating | 85.79% | 94.8% |

In general, each of the compositions is prepared by placing the resin at approximately 100° F. in a container under low sheer mixing, then adding the surfactant and solid lubricant (e.g. SHAMROCK 394 polyethylene) and mixing to effect thorough incorporation of the solid lubricant. If additional carboxy methyl cellulose is to be added, it is added at this stage and the mixture is stirred until the carboxy methyl cellulose is thoroughly dispersed. Next, the temporary binder, e.g. "AVICEL", is rapidly added while avoiding clumping and lumps, and then the abrasive mineral particles are added as quickly as possible. The microcrystalline cellulose of the "AVICEL" swells slightly under these conditions to retain the alumina particles in suspension.

Alternatively, an aqueous slurry of the abrasion-resistant composition can be prepared substantially in accordance with Scher et al U.S. Pat. No. 4,255,480. Such slurry can then be dried to obtain a powder, the "AVICEL" becoming at least partially swelled during this process. The resultant powder can then be added to the impregnating resin as described above.

Regardless of how the impregnating resin/abrasion-resistant composition is formed, it is then applied to the decor paper in a single stage. Preferably, the quantity of abrasion-resistant composition relative to the liquid impregnating resin may be, in the case of the manufacture of a high pressure laminate having solid color decor paper, about 2% by weight of abrasion-resistant powder based on melamine resin solids in the liquid resin, although such is not required.

The suspension of abrasion-resistant composition in liquid saturating resin is placed in the coater and is applied to the top face of the decor paper by coating the resin/abrasion-resistant composition mixture thereon, the resin quickly migrating into the decor paper, saturating it, and leaving all of the abrasion-resistant composition on the surface of the decor paper. The resultant wet decor paper is then dried in the normal way at an oven temperature of 200°-350° F., when the resin is melamine resin, to advance the resin to the "B" stage, after which it is ready for use in the manufacture of laminates in the normal way.

In the description above, emphasis has been placed on viscosity control, which is in turn dependent to some extent on the porosity of the decor paper being impregnated and coated. As described above, the viscosity may be controlled by controlling the quantity of water in the impregnating resin/abrasion-resistant composition. However, there are other ways to reduce the viscosity of the composition besides adding water. Indeed, other means may be preferred because the addition of excess water means that subsequently such water must be driven off, which requires additional time and energy. Another problem with merely adding more water is that the addition of too much water can result in settling of the abrasion-resistant hard mineral particles out of suspension in the coating bath.

In general, any means by which the viscosity can be reduced is theoretically usable, so long as it can be controlled to work in the present environment. There may be briefly mentioned, besides dilution with water, heat and vibration, e.g. ultrasound, the latter of which is possible because the composition is thixotropic. In particular a hot box having a water-saturated atmosphere may be used through which the coated decor paper is passed, which hot box effects heating of the coated composition, without permitting evaporation of the water therefrom to a temperature where the viscosity is reduced desirably to less than 100 cps.

Normally, the use of a hot box is not necessary, especially when the decor sheet is fairly porous, e.g. for solid color decor sheets. However, it has been found very useful when the decor sheet is a print sheet, because the process is otherwise very difficult to control under such circumstances. In such a case, the hot box is located between the point of application of the coating to the decor sheet and the drying zone. In such a case, the coating may be applied at an initial viscosity considerably in excess of 100 cps, e g. at 150 cps. What happens in the heated box is that the coating is heated without permitting the water in the composition to evaporate; this causes the viscosity of the coating to drop considerably, which permits the wicking operation to proceed much more effectively. When running printed decor paper, if no hot box is used, too much of the coating has a tendency to stay on top of the sheet, with the result that the concentration of abrasion-resistant particles is reduced, the paper is insufficiently saturated with resin, and the resultant laminate does not do as well on the sliding can test. When the print paper is looked at from the bottom, the print can be seen through which shows incomplete saturation immediately below the printed indicia.

In general, to obtain good sliding can test results, the melamine resin in the coating must penetrate the paper to the point where a minimum of free resin remains on the surface with the abrasion-resistant hard mineral particles. As a non-limiting example, the viscosity of the coating, while on the paper, should go down to below 100 cps, e.g. to about 50 centipoises, and by doing so one reaches the objective of obtaining 95–100% saturation during the treating. This is accomplished by heating the paper web to 210°–212° F., preferably at least about 205° F., while preventing evaporation of the water in the coating.

As is apparent from the discussion above, a critical feature of the present invention is that the resin component of the coating mixture must completely saturate the paper in order that the resulting laminate have the desirable abrasion-resistant characteristics of U.S. Pat. No. 4,255,480. Specifically, if the resin does not completely saturate the paper, the laminate will have a more rapid gloss change in the sliding can test, and will appear "warn" much earlier than a laminate prepared from decor paper through which the resin has completely saturated. Whereas it was previously believed to be impossible to deposit the ultra-thin abrasion-resistant layer directly from resin, it has now been discovered that this "impossible" result worked, but only when the resin did not form a significant thickness of surface coating along with the abrasion-resistant material and so long as full saturation of the decor paper occurred.

The following specific examples are offered illustratively:

EXAMPLE 1

Warm resin at 100° F. ±5° F. is placed in a container under a low shear mixer. The resin is melamine resin having a density of 1.15 and 37.7% solids. TRITON CF21 surfactant in an amount of 0.001 parts by weight are added per 192.8 lbs of liquid resin, and 0.25 lbs of SHAMROCK 394 polyethylene powder is added. Mixing is continued at a high speed for 5 minutes. One pound of AVICEL (per 192.8 lbs of liquid resin) is rapidly added in a manner as to avoid clumping or the formation of lumps. Immediately thereafter 2 lbs of alumina are added and the mixing is stopped, the addition of the alumina being rapid and being accomplished in less than 3 minutes. The viscosity is measured and sufficient water is added to provide a viscosity of no greater than 150 centipoise (Brookfield viscometer #3 spindle at 12 rpm).

Solid color decor paper weighing 65 lbs/ream is coated at the rate of 196.1 lbs/ream to provide an initial thickness of 11 mils. The decor paper quickly absorbs the resin leaving an ultra-thin abrasion-resistant composition on the face of the decor sheet. The paper is dried at an elevated temperature and is ready for use in the manufacture of decorative laminates.

EXAMPLE 2

Example 1 is repeated with the exception that the melamine resin quantity is 235 lbs of solids. The liquid resin/abrasion-resistant composition mixture is applied at the rate of 238.25 lbs/ream at an initial wet thickness of 13 mils.

EXAMPLE 3

Example 1 is repeated with the following exceptions. The quantity of melamine resin per ream is 111.2 lbs at 37% solids, and the quantity of solid lubricant used is 0.3 lbs. Furthermore, after addition of the surfactant and polyethylene followed by mixing for 5 minutes, there is added 0.35 lbs (per 111.2 lbs of resin solids) of carboxy methyl cellulose mixed in 24 lbs of water; this mixture is added directly to the batch and is stirred for about two or three minutes until dispersed.

The process further deviates from Example 1 in the use of 2.33 lbs of AVICEL and 4.66 lbs of alumina per 111.2 lbs of resin solids. After addition and mixing, the viscosity is reduced to no greater than 100 centipoise. This composition is applied to 50 lb woodgrain printed decor paper at the rate of 118.5 lbs/ream at an initial thickness of 7 mils, and the paper is dried as described in Example 1.

EXAMPLE 4

The coated and saturated decor sheets prepared in Examples 1–3 are used to prepare high pressure decorative laminates as disclosed in U.S. Pat. No. 4,255.480. Coating weights of 2.5–3.5 lbs of abrasion-resistant composition/melamine resin solids per ream of solid color decor paper produced high pressure laminates having a rate of wear of 0.003–0.008 g per 100 cycles measured according to NEMA LD3-1980. Ultra-thin coating weights of 6.5–7.5 lbs/ream on the woodgrain decor paper gave an initial wear of 600–1000 cycles. The samples gave superior results when subjected to the sliding can test. In all cases, the products were indistinguishable from laminate made by the process of Scher et al U.S. Pat. No. 4,255,480.

EXAMPLE 5

This example illustrates a highly calendered, printed woodgrain pattern decor sheet, and illustrates what happens to the sliding can wear resistance when viscosity is modified by a dilution.

| A. Basic Formulation: | |
|---|---|
| 1.240 S.G. melamine resin at 62% solids | 6000 g |
| AVICEL micro crystalline cellulose | 134.6 g |
| 20 Micron alumina | 403.8 g |
| TRITON CF21 surfactant | .14 g |
| | 6538.54 g |

Viscosity - 1550 cps
Dilute with water to desired viscosity

| | B. Coating Results: | | | | |
|---|---|---|---|---|---|
| Sample # | 1 | 2 | 3 | 4 | 5 |
| Viscosity (via Dilution) | 1550 cps | 610 cps | 325 cps | 150 cps | 95 cps |
| Penetration after Coating | V. Poor | Poor | Poor | Fair | Good |
| Surface Gloss | V. Glossy | Glossy | Glossy | Glossy | Dull |

The coated paper was then combined with phenolic resin impregnated core paper and consolidated under heat and pressure in a conventional manner to produce laminate.

| Sliding Can | 10,000 | 17,000 | 25,000 | 28,000 | 76,000 |

The obsservations that surface gloss level drops off and penetration through the sheet goes up is consistent with the proposed mechanism for this technique: that is, all of the resin must soak into the paper leaving the ultra-thin binder material/mineral particle layer with a minimum of resin. The final result is a laminate surface equivalent to U.S. Pat. No. 4,263,081.

EXAMPLE 6

Another technique used successfully to promote penetration, as noted above, is to reduce the viscosity after it has been coated on the sheet. The approach has been to apply a 200+ centipoise coating on to the paper surface and then heat the coating rapidly so that the viscosity drops down below the 100 cps saturation threshold. Tests have shown that the mixture will decrease in viscosity in proportion to its temperature during rapid heating.

To accomplish this on the coating line, a box was constructed through which the coated paper is passed prior to entering the oven. Heating was provided by either radiant lamps, live steam or a combination of both. The results were that both radiant lamps and live steam worked; however, the best case was the combination of the two. The problem encountered with just radiant heat is that it is difficult to elevate the coating temperatures to 210°–212° F. without evaporating some of the water. When evaporation takes place, the viscosity dramatically increases due to the increase in solids, resulting in a sharp decrease in penetration.

When the steam is introduced into the box, the atmosphere is saturated with moisture (100% RH). Since drying rate of the coating is proportional to the difference between the relative humidity in the air and the equivalent RH in the coating, the water in the coating cannot evaporate.

Under these conditions, it is therefore possible to elevate the coating temperature to 210° F. without drying. This allows the viscosity to drop and the coating to penetrate rapidly.

A secondary advantage is that the coated paper enters the drying oven at an elevated temperature, reducing the required exposure time in the oven—i.e. the line speed increases.

Given this approach that heating the coating in situ will reduce the viscosity and aid penetration, it is easy to see tht various approaches can be used to heat the coating. Microwave heating of water is well known and should function easily for in situ viscosity reduction.

EXAMPLE 7

Example of hot box aided penetration on calendered decor paper having a woodgrain pattern:

| A. Coating Formulation: | |
|---|---|
| 1.24 sq. melamine @ 62% solids | 6080 g |
| $H_2O$ | 2032 g |
| Carboxymethyl Cellulose CM77L | 39.2 g |
| Avicel microcrystalline | 236.0 g |
| Alumina 30 micron | 472.0 g |

Viscosity 140 cps

| B. Coating and laminating results: | | |
|---|---|---|
| Condition 1. | No steam. No heat prior to oven. Result: No penetration through paper. | |
| Condition 2. | Steam back of paper before coating. No heat or steam after coater before oven. Result: Slight improvement in penetration. | |
| Condition 3. | Hot Box after coating - steam generated heat. Result: Penetration through the sheet is complete. | |
| | Abrasion Initial Point | Sliding Can |
| Condition 1. | 525 | Buffing @ 5000 cycles |
| Condition 2. | Approx. 525 | Approx. 5000 cycles |
| Condition 3. | 1525 | >100,000 cycles |

In summary, Examples 5–7 demonstrate:

(1) It is necessary to have a concentrated ultra-thin layer of binder material/mineral particle composition on the laminate surface, without excessive dilution by the melamine resin. If the surface contains too much resin, the mineral particles are scattered through the resin layer, and in this state do not provide good resistance to gloss change in the sliding can test.

(2) It is possible to obtain a suitable composition that allows the resin phase to wick through the paper, leaving the binder material/mineral particle composition on the surface in an ultra-thin layer, by keeping the viscosity of the composition low, or by lowering the viscosity after coating but before oven drying.

(3) It is advantageous to start with a relatively high solids content coating composition (and therefore higher than desired viscosity) and then lower the viscosity by passing the coated paper through a heated box containing 100% RH air. The advantages are that high viscosity higher solids compositions have less tendency to settle out in the coating equipment, are easier to physically coat at the coating weights required, and also require less water to be evaporated in the oven, thus running faster, and requiring less energy for evaporation.

A significant difference between the present process and the Fuerst patents is that Fuerst impregnated the decor sheet first with plain melamine resin, and then coated the impregnated sheet with a very viscous mixture. Because the paper was already saturated at the time the mixture was applied, it would not absorb the viscous coating which dried on the surface, and the dried surface coating was 2–3 mils thick. Thus, the grit particles were distributed through a thick layer, and not concentrated at the surface. In the present process, to the contrary, the resin/abrasion-resistant composition mixture of low viscosity is applied to the face of unsaturated paper, so that most of the resin migrates into the paper, leaving an ultra-thin layer of about 0.2–0.3 mils thickness of grit on the surface of the pressed laminate. As in Scher et al U.S. Pat. No. 4,255,480, the grit particles are concentrated at the surface, providing very good abrasion resistance as measured by all tests, including the sliding can test.

Samples prepared by using the Fuerst method and by the present method were subjected to both the NEMA abrasion-resistance test and to the sliding can test. Both methods result in good NEMA abrasion resistance as would be expected. However, in the sliding can test which simulates wear under real field conditions, the Fuerst samples showed immediate loss of gloss, whereas the samples made according to the present process resisted gloss change, just as do the samples made according to Scher et al U.S. Pat. No. 4,255,480. Samples of laminate made by the present process are equal to samples made according to U.S. Pat. No. 4,255,480 in sliding can performance.

The present process is also dissimilar to the aforementioned Power and Raghava patents not only because of the different materials used and the different results achieved, but also because such prior art procedures use plural steps, effect drying of the decor sheet between the saturating and coating steps, and further because such procedures are commercially impractical because it is extremely difficult, if at all possible, to maintain the mineral particles suspended in the saturating resin in a suitable way so as to permit the mixture to be applied by a coater.

It will be obvious to those skilled in the art that various changes may be made without departing from the scope of the invention and the invention is not to be considered limited to what is described in the specification.

What is claimed is:

1. A method of providing a paper facing sheet for use as the uppermost sheet in the manufacture of an abrasion-resistant decorative laminate, the method consisting essentially of
preparing in mixture of a liquid thermosettable impregnating resin and an abrasion-resistant composition, said mixture during subsequent coating and impregnation having a viscosity no greater than about 200 centipoise, said abrasion-resistant composition comprising a mixture of (1) an abrasion-resistant hard mineral of fine particle size in quantity sufficient to provide an abrasion-resistant layer without interfering with visibility and (2) binder material for said mineral which binder material has the properties of withstanding the subsequent laminating conditions and being compatible with said thermosetting resin, said binder being present in an amount sufficient to bind said abrasion-resistant mineral to the surface of an unsaturated paper sheet, and said binder material suspending said abrasion-resistant hard mineral particles in said liquid thermosettable impregnating resin;
effecting coating and impregnating in essentially one step by coating said mixture of said liquid thermosettable impregnating resin and said abrasion-resistant composition over the facing surface of said unsaturated paper sheet at a rate such that said paper sheet becomes substantially saturated with said liquid resin, and said abrasion-resistant composition becomes deposited on said facing surface in an ultra-thin layer, said mixture having a viscosity no greater than about 200 centipoise during saturation of said paper sheet; and
drying said coated and impregnated paper sheet at an elevated temperature and thereby obtaining a paper facing sheet for use as the uppermost sheet in the manufacture of a decorative laminate.

2. A method according to claim 1 wherein said drying is effected at a temperature of at least 140° F.

3. A method according to claim 1 wherein said binder material is a mixture of microcrystalline cellulose and carboxy methyl cellulose, said microcrystalline cellulose being at least partially swelled prior to said coating, to effect suspension of said hard mineral particles.

4. A method according to claim 1 wherein said thermosettable liquid impregnating resin is melamineformaldehyde resin or polyester resin.

5. A method in accordance with claim 1 wherein said abrasion-resistant mineral is alumina, silica or a mixture thereof.

6. A method according to claim 1 wherein said binder material comprises a mixture of microcrystalline cellulose and carboxy methyl cellulose and said mineral comprises alumina, the ratio of alumina to binder material being about 4:1 to 1:2, said coating step being carried out at such a rate as to provide an ultra-thin coating, after drying, of thickness from about 0.02 to about 0.3 mils thick.

7. A method in accordance with claim 1 wherein said abrasion-resistant composition further comprises a small amount of surfactant, or a mixture thereof with a small amount of solid lubricant.

8. A method in accordance with claim 1 wherein said facing sheet is a decor sheet.

9. A method in accordance with claim 8 wherein liquid impregnating resin is also applied to the bottom of said unsaturated paper sheet immediately after said coating.

10. A method in accordance with claim 8 comprising reducing the viscosity of said composition immediately after it has been coated over the facing surface of said decor sheet.

11. A method in accordance with claim 10 wherein said reducing of the viscosity is effected by heating the coating while preventing substantial evaporation of liquid.

12. A method of producing an abrasion-resistant decorative laminate from at least one backing layer and a thermosettable resin impregnated decor facing sheet in accordance with claim 8, said laminate having enhanced abrasion resistance without an overlay layer, the method comprising
assembling said resin impregnated, coated and dried decor sheet over said backing layer; and
subjecting said assembly to heat and pressure sufficient to effect consolidation of said backing layer and said facing decor sheet to thereby provide said abrasion-resistant decorative laminate.

13. A method according to claim 11 wherein said backing layer comprises a plurality of phenolic resin impregnated kraft paper sheets, and said thermosetting resin comprises melamineformaldehyde resin, the heat and pressure to which that assembly is subjected to effect consolidation being about 230°–340° F., and 800–1600 psi.

14. A method according to claim 13 wherein said drying is effected at a temperature of at least 140° F.

15. A method according to claim 13 wherein said binder material is a mixture of microcrystalline cellulose and carboxy methyl cellulose, said microcrystalline cellulose being at least partially swelled prior to said coating, to effect suspension of said hard mineral particles.

16. A method according to claim 13 wherein said thermosettable liquid impregnating resin is melamineformaldehyde resin or polyester resin.

17. A method in accordance with claim 13 wherein said abrasion-resistant mineral is alumina, silica or a mixture thereof.

18. A method according to claim 13 wherein said binder material comprises a mixture of microcrystalline cellulose and carboxy methyl cellulose and said mineral comprises alumina, the ratio of alumina to binder material being about 4:1 to 1:2, said coating step being carried out at such a rate as to provide an ultra-thin coating, after drying, of thickness from about 0.02 to about 0.3 mils thick.

19. A method in accordance with claim 13 wherein said abrasion-resistant composition further comprises a small amount of surfactant, or a mixture thereof with a small amount of solid lubricant.

* * * * *